United States Patent
Gnagy et al.

(10) Patent No.: US 7,058,633 B1
(45) Date of Patent: Jun. 6, 2006

(54) SYSTEM AND METHOD FOR GENERALIZED URL-REWRITING

(75) Inventors: Matthew R. Gnagy, Santa Barbara, CA (US); Jean-Philippe Champagne, Goleta, CA (US); James A. Aviani, Santa Barbara, CA (US); Bruce Arthur Lueckenhoff, Santa Barbara, CA (US); James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 463 days.

(21) Appl. No.: 10/237,339

(22) Filed: Sep. 9, 2002

(51) Int. Cl.
*G06F 17/30* (2006.01)

(52) U.S. Cl. .............................. 707/10; 707/1; 707/101
(58) Field of Classification Search ................ 709/224, 709/206, 201, 218, 230; 707/104.1; 370/465
See application file for complete search history.

(56) References Cited

U.S. PATENT DOCUMENTS

| | | | | | |
|---|---|---|---|---|---|
| 5,572,643 | A | * | 11/1996 | Judson | 709/218 |
| 5,809,233 | A | * | 9/1998 | Shur | 709/230 |
| 6,081,900 | A | * | 6/2000 | Subramaniam et al. | 726/19 |
| 6,202,087 | B1 | * | 3/2001 | Gadish | 709/206 |
| 6,345,303 | B1 | * | 2/2002 | Knauerhase et al. | 709/238 |
| 6,389,462 | B1 | * | 5/2002 | Cohen et al. | 709/218 |
| 6,470,027 | B1 | * | 10/2002 | Birrell, Jr. | 370/465 |
| 6,578,078 | B1 | * | 6/2003 | Smith et al. | 709/224 |
| 2002/0116444 | A1 | * | 8/2002 | Chaudhri et al. | 709/201 |
| 2004/0230820 | A1 | * | 11/2004 | Hui Hsu et al. | 713/200 |

* cited by examiner

*Primary Examiner*—Charles Rones
*Assistant Examiner*—Jacob F. Betit
(74) *Attorney, Agent, or Firm*—BainwoodHuang

(57) ABSTRACT

A URL re-writing system and method in a network examines and modifies HTML data and its embedded URLs. The re-writing system can be implemented in a router and can replace URLs found in the HTML data in order to accomplish more efficient routing for example to a close mirror site or for content routing. The re-writing system can also use URL replacement to insert important or emergency information to data received by users on a Web-based network.

17 Claims, 8 Drawing Sheets

SYSTEM AND METHOD FOR GENERALIZED URL-REWRITING

BACKGROUND OF THE INVENTION

The World Wide Web (Web) is a network of information resources. The Web relies on three mechanisms to make these resources readily available to the widest possible audience: (1) A uniform naming scheme for locating resources on the Web (e.g., Uniform Resource Identifiers); (2) Protocols, for access to named resources over the Web (e.g., HTTP); and (3) Hypertext, for easy navigation among resources (e.g., HTML).

A Universal Resource Locator (URL) is a type of Uniform Resource Identifier (URI). Every resource available on the Web—an HTML document, an image, a video clip, a program, etc.—has an address that is encodable by a URL. URLs typically consist of three pieces: (1) The naming scheme of the mechanism, or protocol, used to access the resource; (2) The domain name of the machine hosting the resource; and (3) The name of the resource itself, given as a path.

For example, the following URL, "http://www.example.com/important.htm" indicates that the protocol to be used is HyperText Transfer Protocol (HTTP) and that the domain name of the resource is "www.example.com" and that the resource is named "important.htm." That is, the URL locates a resource on the Web and, given the appropriate protocol, a program can retrieve that resource. As such, a URL alone provides a great deal of information. Service providers and enterprises can inspect URLs in order to obtain this information for purposes such as statistical purposes. Further, software programs or data communications devices can block traffic to undesired sites based on URLs.

The Domain Name System (DNS), also referred to as the Domain Name Service, is an Internet service that translates domain names into IP addresses. Domain names are alphanumeric and therefore are easier for people to remember. The Internet, however, is based on IP addresses. The format of an IP address is a 32-bit numeric address written as four numbers separated by periods. Each number can range from zero to 255. For example, 1.160.10.240 is a possible IP address. DNS translates every domain name transmitted from a Web browser into the corresponding IP address. For example, the domain name "www.example.com" might translate to 198.105.232.4. The DNS system is its own network. If one DNS server does not know how to translate a particular domain name, it asks another DNS server, and so on, until the correct IP address is returned.

When a browser on a client connected to the Web forms a connection to a Web server and requests a page, the browser first divides the Web page's URL into three parts: (1) the protocol ("http"); (2) the domain name ("www.example.com"); and (3) the file name ("important.htm"). The browser then communicates with DNS to translate the domain name "www.example.com" into an IP address which is used to connect to the server. The browser then forms a connection to the server at that IP address. Following the HTTP protocol, the browser sends a GET request to the server, asking for the file "http://www.example.com/important.htm". The server sends the HTML text of the Web page to the browser in response to the GET request. The browser reads the HTML tags in the HTML text and formats the page for display.

Network Address Translation (NAT) is an Internet standard that enables a local area network (LAN) to use one set of IP addresses for internal traffic and a second set of addresses for external traffic. NAT serves three main purposes: (1) NAT provides a type of firewall by hiding internal IP addresses; (2) NAT enables an organization to use more internal IP addresses (since the IP addresses are used only internally, they do not conflict with IP addresses used by other companies and organizations); and (3) NAT allows a company to combine multiple ISDN connections into a single Internet connection.

A content delivery network (CDN) is a network of servers that delivers a Web page to a user based on the geographic locations of the user, the origin server of the Web page and local servers. Within the CDN, copies of the pages of a Web site are stored in local servers called content engines (also called edge servers) that are dispersed at geographically different locations, caching the contents of the Web page. Content routers in the CDN route user requests to an appropriate content engine. When a user requests a Web page that is part of a CDN, the CDN redirects the request from the originating site's server to a server in the CDN that is closest to the user and delivers the cached content from that closest server. The CDN also communicates with the originating server to deliver any content that has not been previously cached. This service is effective in speeding the delivery of content of Web sites with high traffic and Web sites that have global reach. Typically, the closer the content engine is to the user geographically, the faster the content will be delivered to the user. CDNs also provide protection from large surges in traffic.

SUMMARY OF THE INVENTION

Current network technology does not support altering URLs in data as it is passing through a network. Also, no current techniques enable service providers to capitalize on the potential to provide additional information to the web browser using the URLs. Embodiments of the present invention significantly overcome such deficiencies and provide mechanisms and techniques for re-writing URLs existing within data (e.g., embedded in a Web page) while traveling in the network.

According to principles of the invention, a URL re-writing system in a network can inspect and modify HTML of a Web page and its embedded URLs as the Web page data passes through the network. That is, embodiments of the invention substitute alternative URLs for URLs received at network devices. This enables an enterprise or an Internet service provider (ISP) to provide customized information to a user's Web browser. Such information can be used for multiple purposes. For example, a URL for a close mirror site can be substituted for a URL from a distant site to provide efficient content routing. Exchanging one URL for another also enables the system to replace a requested URL with a URL pointing to important information such as an emergency notification. Finally, exchanging one URL for another enables the system to defeat filtering and advertisement blocking systems in order to successfully display advertisements on a Web browser using a filtering or ad blocking system.

In one embodiment, the re-writing system is used in content routing. By rewriting URLs as the URLs pass through the network from an origin server to the Web browser, the Web browser client can be routed to close mirror sites on the fly. The invention accomplishes this by changing the original URL to a more specific URL (i.e., "yahoo.com" becomes "boston.yahoo.com" or alternatively "yahoo.ispname.com") for example by replacing the domain in the URL with the domain of a mirror site. In the latter case, the invention reduces DNS request/reply overhead, further speeding the overall page download. The device providing the URL-rewriting typically has a relationship with the content distribution network (CDN). By renaming "yahoo.com" to "boston.yahoo.com", content routing is made easier. For example, when Yahoo!®'s content router sees a request for "boston.yahoo.com", it needs only to choose from among Yahoo!® mirror sites in the Boston area. This scheme is also useful in an enterprise CDN because of the required cooperation between the Web server and the CDN edge device that is rewriting the URLs.

In another embodiment, the re-writing system operates to defeat ad blockers and Web filters. There are currently available Web filters and proxies that will strip out Web content based on domain name. The filters typically block access to sites with objectionable content or to block advertisements. Internet Service Providers (ISPs) may want to guarantee that their customers cannot filter particular URLs and IP addresses so that advertisers can launch a successful advertising campaign without being thwarted by filters. While it is difficult to stop all forms of filtering, the technique for rewriting URLs described herein enables ISPs to prevent their customers from blocking URLs—a service that the ISP can then offer to advertisers.

In the Web filter embodiment, the system rewrites URLs that point to the advertisement publisher with URLs having arbitrary names. By having an arbitrary name rather than the identified advertisement publisher domain, the invention can foil client URL filters. The re-writing system, however, also intercepts DNS traffic and translate the false domains back to the real domains so name lookups succeed. The invention uses this technique to prevent filters from blocking particular IP addresses. The invention can change URLs that contain IP addresses that should not be blocked to contain private IP addresses such as 10.x.x.x or a pool of real IP addresses the ISP has set aside. When Web requests are made to these IP addresses, the re-writing system recognizes this and changes the false IP back to the original IP before sending the packet on its way. In a further alternative embodiment, the re-writing system translates a selected number of "normal" URLs pointing to data that a user intends to see in order to prevent the URL filters from "outsmarting" the re-writing system. This modification prevents a filter from blocking arbitrary URLs because the filter will then block some of the data that the user at the Web browser wants to see. Typically, replacing URLs arbitrarily would be limited to static content such as GIF and JPEG images, so bookmarked pages will not point to a random domain name.

The ability to alter URLs "on the fly" allows Internet content to be enhanced in ways previously not possible. It simplifies content routing and opens new revenue streams for service providers. In addition, organizations can use the re-writing system to distribute priority and emergency information. Further, alternative embodiments of the invention include implementing the re-writing system in a proxy server, or in a Network Address Translation (NAT) device, or in a Network Translation Engine (NTE). Further alternative embodiments of the system include implementing the re-writing system in a transcoding server in a wireless device such as a wireless telephone.

More specifically, embodiments of the invention provide methods and apparatus that re-write URLs in data in a network with alternative URLs by examining the data for links (or URLs) to additional data, comparing the found links with links stored in a database. If there is a match with a particular link in the database, that link is rewritten in the Web data with an alternative link from the database.

In one embodiment of the invention, the database stores original server URLs and corresponding mirror site URLs. When a client makes a data request for an originating server, the re-writing system of the present invention examines the data for links which are compared to the server URLs stored in the database. Any matching links in the received data are re-written with links to mirror sites. The re-written data is forwarded to the client in response to the data request.

In another embodiment of the invention, the database stores original server URLs and corresponding content engines. The data is examined for links and which are the compared to the server URLs in the database. Matching links are re-written with links to content engines and the re-written data is forwarded to the client.

In another embodiment of the invention, the database stores advertiser URLs. In one arrangement, corresponding arbitrary URLs are stored in the database ahead of examining data. Data received in response to a client request is examined for links which are then compared to the stored advertiser URLs. Matching links are re-written with arbitrary links from the database. The data having the re-written links is then forwarded to the client. The client makes additional data requests based on the re-written links. The re-writing system, upon receiving requests having arbitrary links, translates the arbitrary links back to the original URLs. In another arrangement of the invention, arbitrary names are generated as advertiser links are found and then the arbitrary name is stored in the database along with the original link so that the arbitrary name can be translated back to the original name when needed. In another arrangement of the invention, links to data other than advertiser data are also re-written with arbitrary URLs in order to discourage use of filtering systems at the client that block out all arbitrary URLs.

Alternative embodiments of the present invention including implementing a plurality of the re-writing systems in a network such that if a match to a link is not found in a first re-writing system, the link information is forwarded to a second re-writing system in the network and so on until a match is found or until the process times out. The re-writing system of the present invention can be implemented as part of a router in a content delivery network to provide URL redirection to content engines. In another arrangement of the invention, the re-writing system is implemented as part of a Network Address Translation system. In still another arrangement of the invention, the re-writing system is implemented as part of a proxy server.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

Embodiments of the invention provide a re-writing system that operates to substitute an alternative reference to data for a received reference to data over the course of transmission of data over a network. A client sends a request for data over the network. The re-writing system intercepts and examines data returned in response to the client's request. The re-writing system examines the returned data for references to data outside the returned data, that is, links to additional data. A type of link is a URL. The re-writing system has a database of link information with entries of links and associated alternative links. If the returned data has links to other data, the re-writing system compares the links to stored links. If a match is found, the re-writing system substitutes the matching alternative link for the original link. The re-writing system forwards the returned data with the substitutions to the client.

Figure 1:
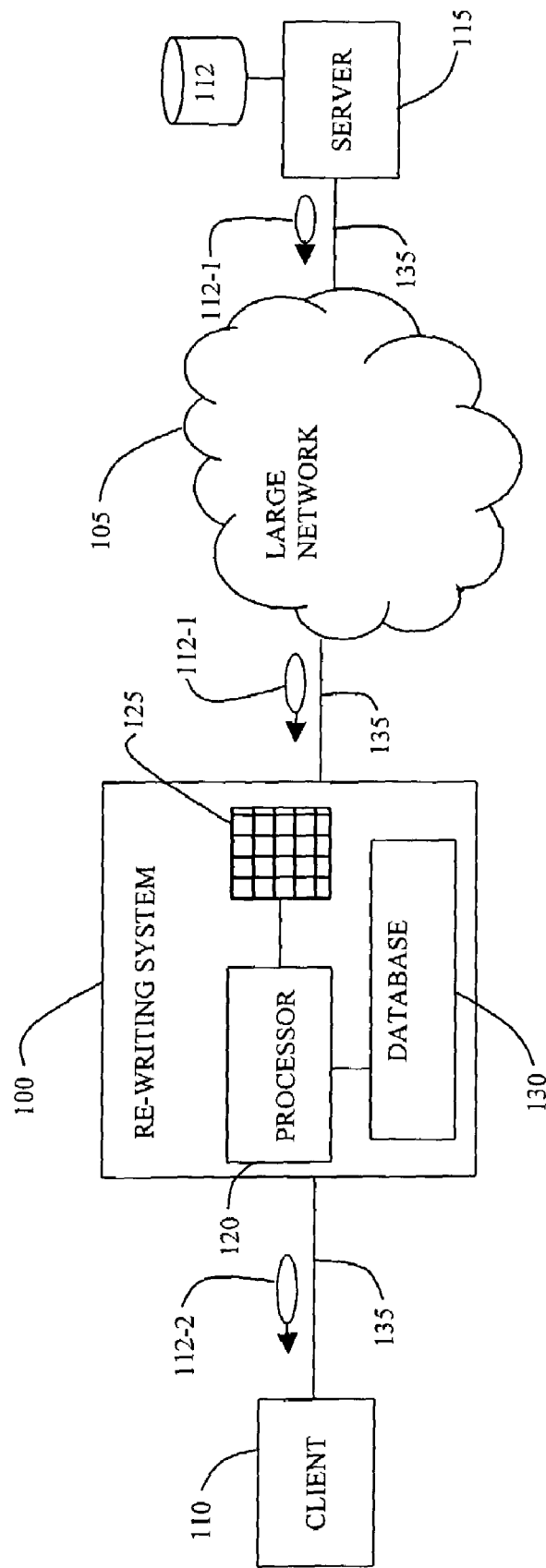
FIG. 1 is a block diagram of a computer network including a re-writing system according to the principles of the present invention.

FIG. 1 is a block diagram of a re-writing system 100 according to principles of the invention operating in a large network 105 such as the Internet illustrating a first embodiment of the invention. The re-writing system 100 is located in the data pathway 135 between a client 110 and a server 115 connected to the network 105. The re-writing system 100 has a processor 120, a memory 125 and a database 130. The database 130 stores original URLs and associated alternate URLs. In a first arrangement of the invention, the alternative URLs are URLs pointing to alternative locations where the same data can be found as the data pointed to by the original URL. In a second arrangement, the alternative URLs have replacement domain names meant to disguise the original URL domain names. In a third arrangement of the invention, the alternative URLs are URLs pointing to data meant to replace or to supplement the data pointed to initially in the original URL.

In operation, the client 110 makes a request for data 112, such as a Web page, from the server 115. The server 115 returns the data 112-1 in response to the client request. The re-writing system 100 examines the returned data 112-1 for links, that is, URLs, to other data. The re-writing system 100 determines, based on stored entries in the database 130, whether there are alternate URLs for those present in the returned data. If an alternate URL exists for a particular URL found in the returned data 112-1, the re-writing system 100 replaces the URL in the returned data with the alternate URL from the database 130. After link replacement is finished, the re-writing system 100 adjusts the returned data 112-1 as will be described below. The data is adjusted in order to avoid violating data expectations and checks at the client browser. The re-writing system 100 then transmits the adjusted data 112-2 to the client 110.

Figure 2:
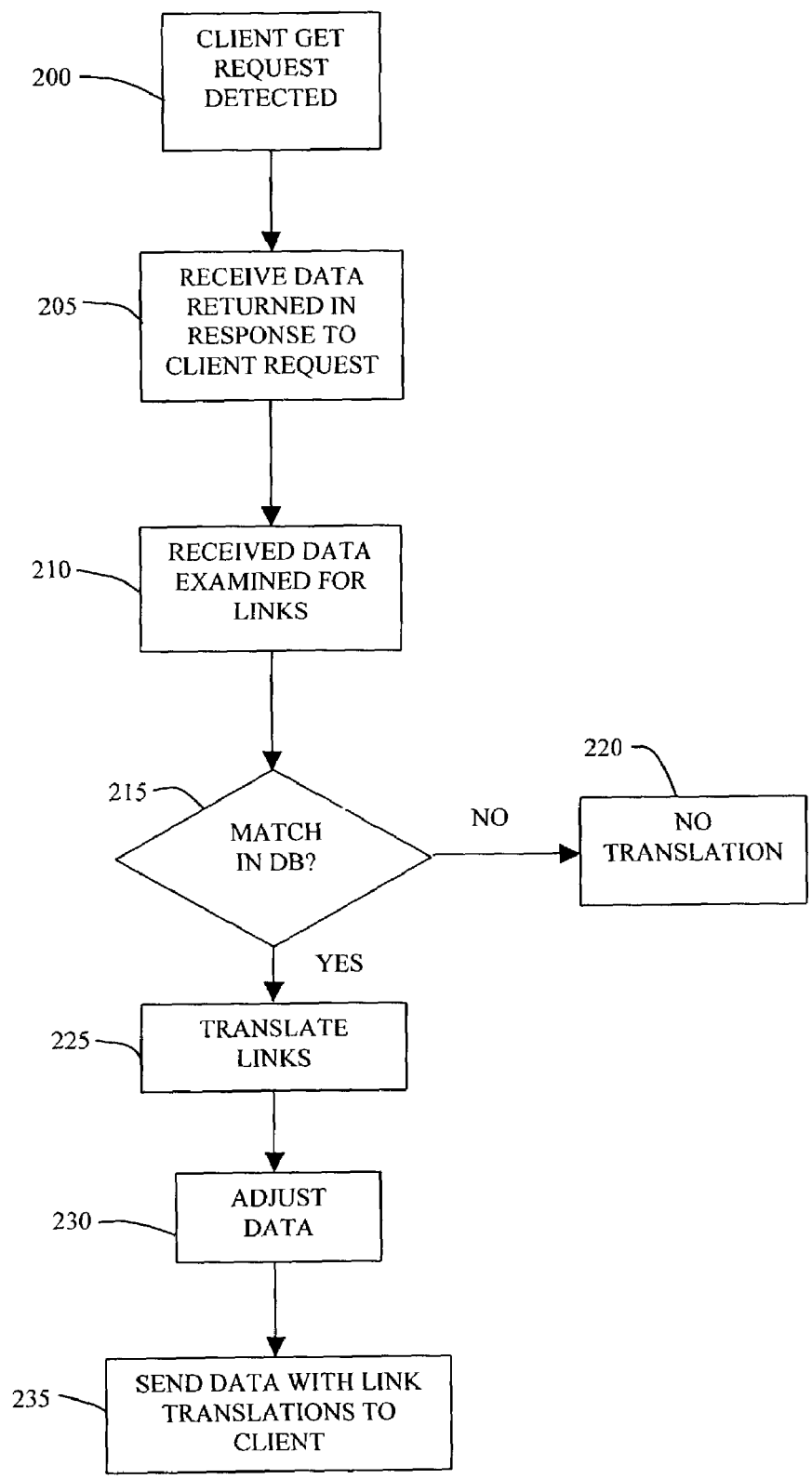
FIG. 2 is a flow chart of the operation of the re-writing system of FIG. 1.

FIG. 2 is a flow chart of the operation of the re-writing system 100 of FIG. 1. For example, where the client is requesting a Web page, the re-writing system 100 detects the client GET request requesting the Web page from the server 115, block 200. The re-writing system 100 receives the Web page returned from the server 115 in response to the client request, block 205. The re-writing system 100 examines the returned Web page for links to other data, block 210. The re-writing system then searches the database 130 for entries matching the links found in the Web page, block 215. The matching algorithm used may be any string or URL matching algorithm such as prefix-matching or regular-expression-matching. Also, approximate matching is also considered to be within the scope of the invention. The database 130 entries in this embodiment are links paired with alternate links, for example a Web site URL paired with the URL for a mirror site of the Web site. If a found link does not match any entries in the database 130, no re-writing, or "translation", is performed on that link, block 220. For each found link that matches an entry in the database 130, the re-writing system 100 replaces the link with the alternate link found in the database 130, block 225.

Making replacements in the received data can result in problems when forwarding the data to the requesting client because the resulting data may have different characteristics than those the client is expecting. This can result in an error event. To avoid this problem, the re-writing system adjusts the modified Web page, block 230. One solution is to make adjustments to the transmitted datagrams. This is described in detail in U.S. patent application Ser. No. 10/044,216 filed Nov. 20, 2001 and entitled, "Methods and Apparatus for Inserting Data into a Communications Session" which is fully incorporated herein by reference. Another solution is to make the re-written Web page the same length as the original Web page. This can be accomplished by adding data, or padding, where the re-written Web page needs to be made longer or subtracting data where the rewritten Web page needs to be made shorter. Once the re-written Web page is adjusted, the re-writing system forwards it to the client, block 235.

Figure 3:
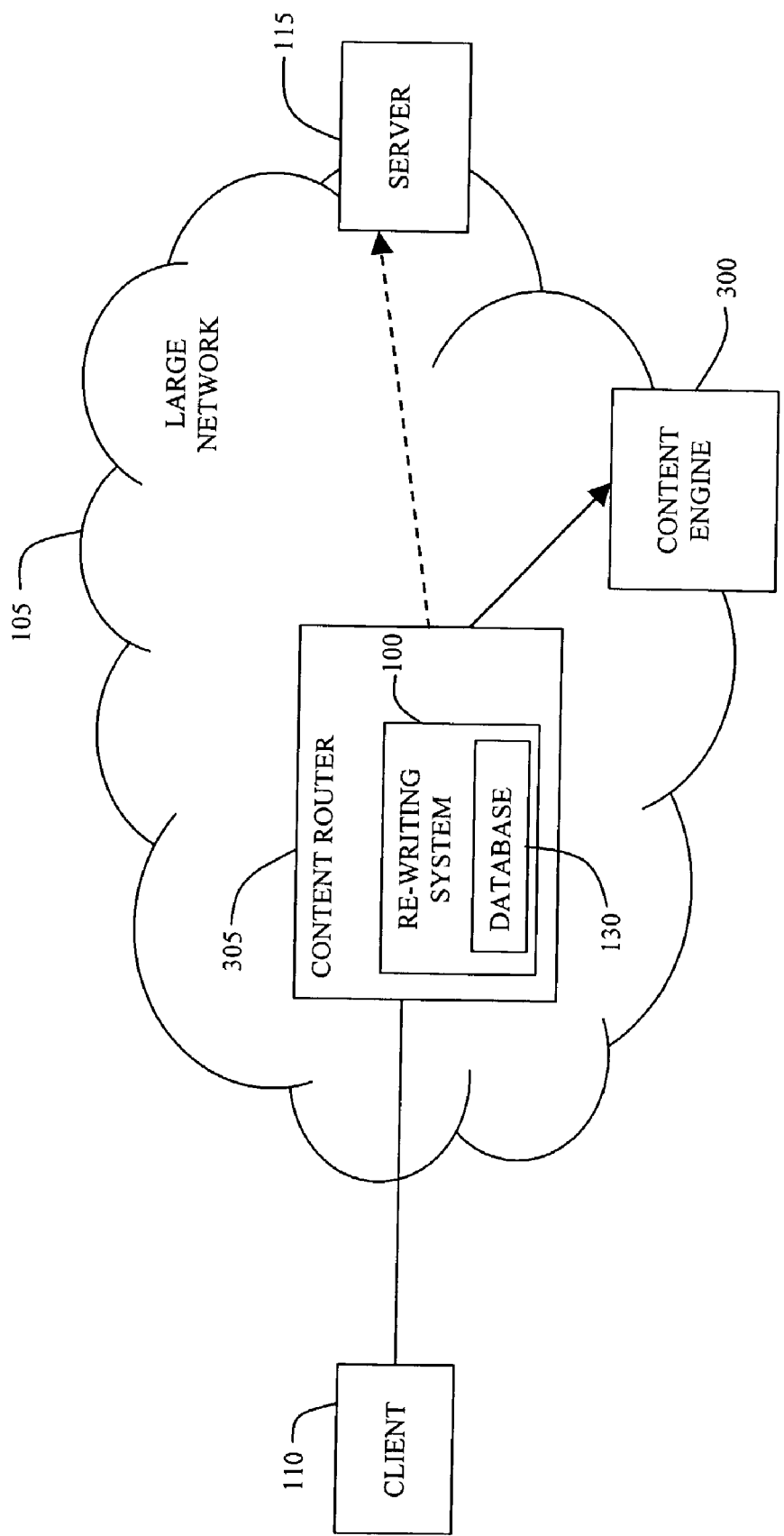
FIG. 3 is a block diagram of an enterprise storage network including a re-writing system according to principles of the present invention.

FIG. 3 illustrates a second embodiment of the re-writing system 100 where the re-writing system 100 is configured for a content distribution network (CDN). The large network 105 connects the client 110 to the server 115 and to a content engine 300. The content engine 300 contains a copy of the data from the server 115. The network 105 also has a content router 305 to route requests in the CDN. The re-writing system 100 is implemented as part of the content router 305. In the present embodiment, the database 130 of the re-writing system 100 stores originating server URLs paired with URLs pointing to content engines.

In operation, the client 110 sends a GET request to the server 115 for example requesting a Web page. The content router 305 intercepts the GET request. When the content router 305 intercepts the client request, the re-writing system 100 compares the requested URL with those stored in its database 130. If it finds match, the re-writing system then directs the client request to the content engine addressed by the alternate URL stored in the database instead of to the server. By rewriting URLs as the URLs pass through the network, the re-writing system causes the Web browser client to be routed to close content engines, or mirror sites, on the fly. For example, an original URL can be re-written as a more specific URL (i.e., yahoo.com becomes boston.yahoo.com or under certain circumstance, yahoo.ispname.com) by simply replacing the domain in the URL with the domain of a mirror site. In this example, the re-writing system 100 reduces the DNS requests/reply overhead, further speeding the overall page download. By renaming yahoo.com to boston.yahoo.com, content routing is made easier. For example, when Yahoo!®'s content router sees a request for boston.yahoo.com, it only needs to choose between Yahoo!® mirror sites in the Boston area.

Figure 4:
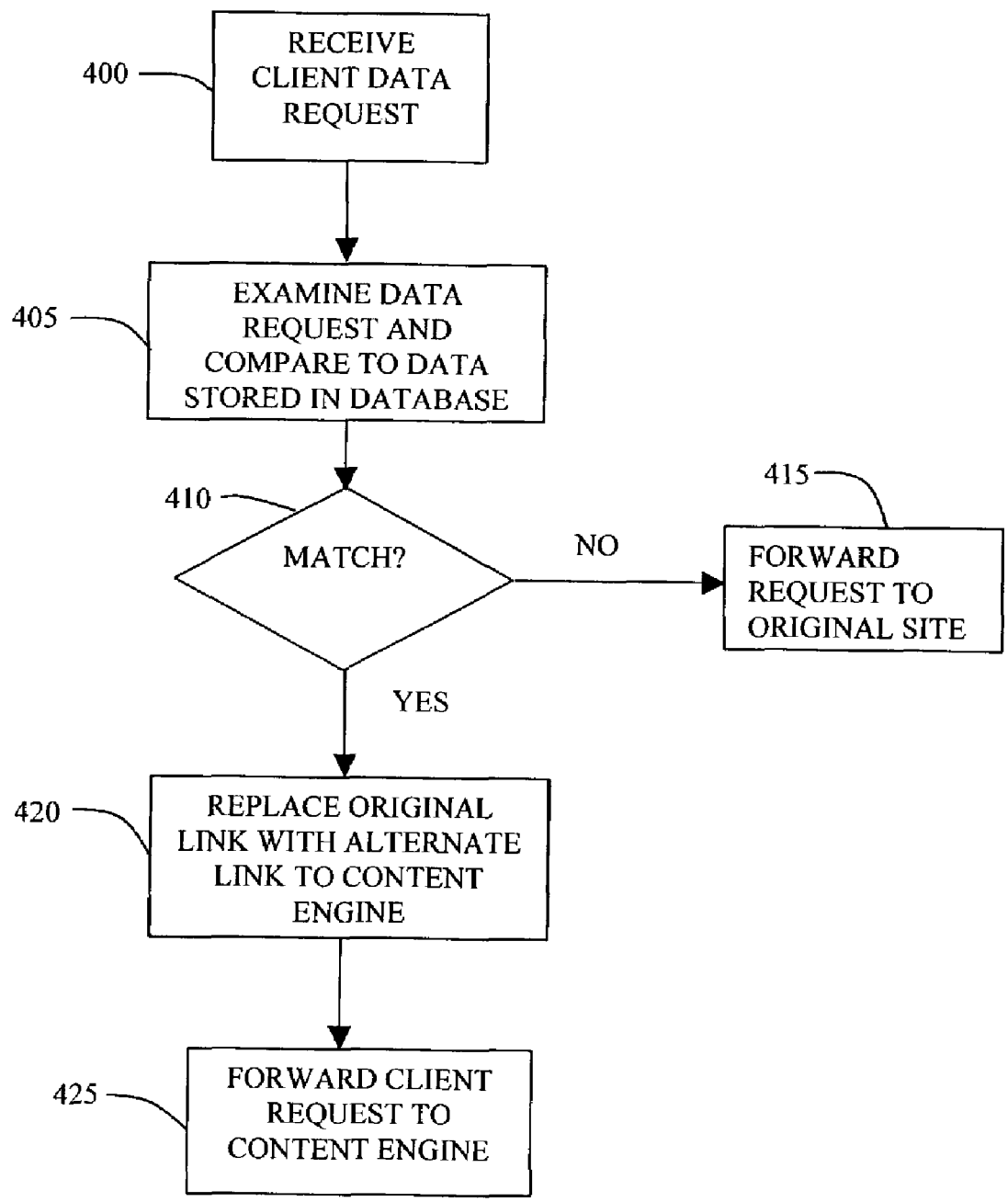
FIG. 4 is a flow chart of the operation of the re-writing system of FIG. 3.

FIG. 4 is a flow chart illustrating the operation of the re-writing system in the content delivery network of FIG. 3. The content router 305 including the re-writing system 100 intercepts the client data request, block 400. The re-writing system 100 examines the data request, block 405. The re-writing system 100 then compares the URL in the data request with URLs stored in the database 130, block 410. If there is no match, the re-writing system 100 simply forwards the client request to the original site, block 415. If there is a match, the URL of the original server is replaced with an alternate URL for the content engine, block 420. The client request is then forwarded to the content engine having the alternate URL, block 425. In this way, client data requests are efficiently routed to closer sites where those sites are available without contributing to network overhead.

Figure 5:
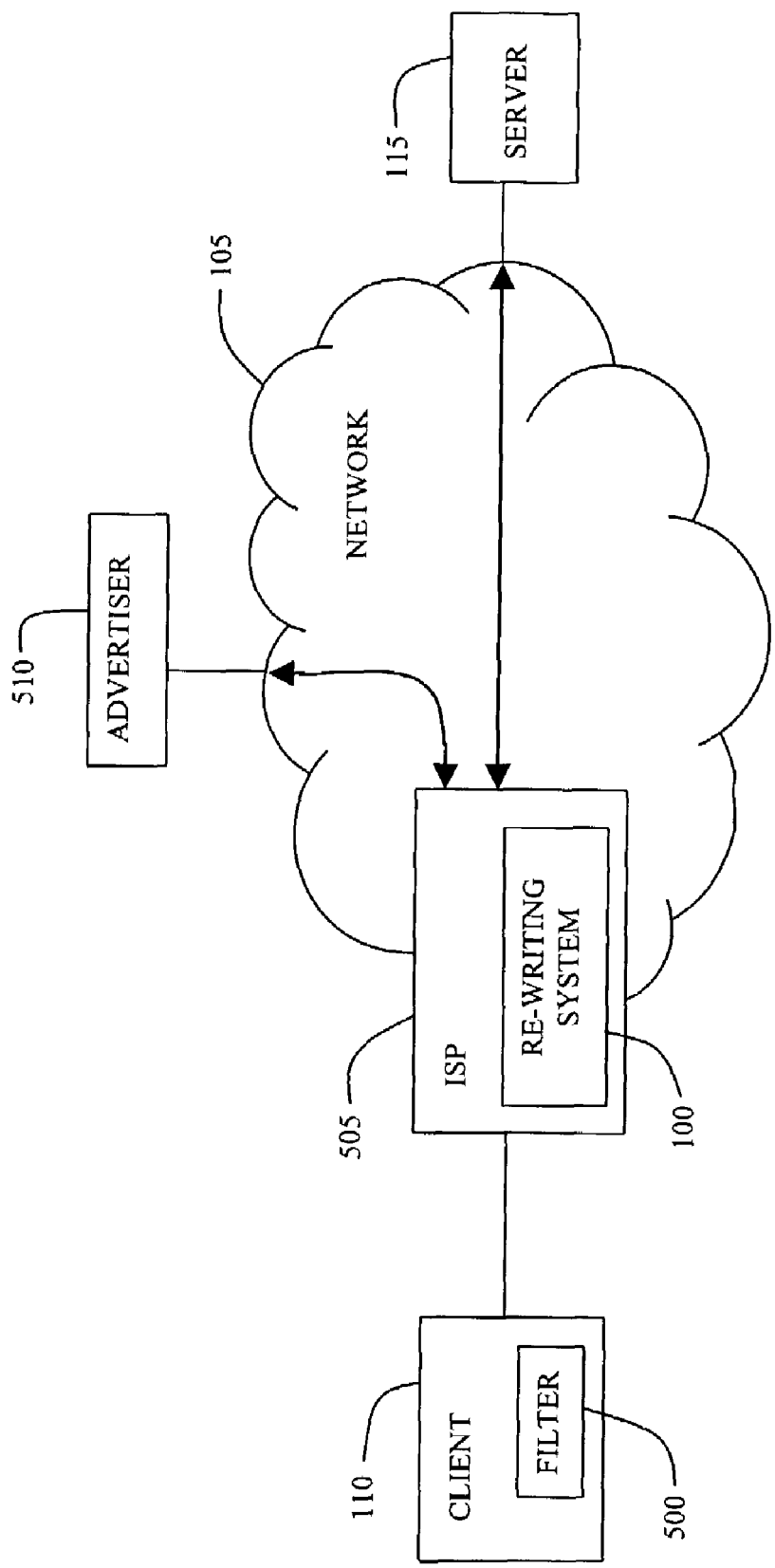
FIG. 5 is a block diagram of a computer network including an Internet service provider having a re-writing system according to principles of the present invention.

FIG. 5 is a block diagram of a network including the re-writing system 100 in a third embodiment where the re-writing system 100 is configured to circumvent ad blockers and Web filters. The client 110 is connected to the server 115 by the network 105. The client 110 has a filter 500 that has the ability to block certain Web content. The re-writing system 100 is implemented in an ISP 505 through which the client 110 accesses the network 105. Also connected to the network 105 is an advertisement publisher 510.

There are currently available Web filters and proxies that remove Web content based on domain name. The filters are typically used to block Web sites with objectionable content or to block advertisements. The capability of guaranteeing that customers cannot filter particular URLs and IP addresses can be a business opportunity for ISPs. An ISP with a re-writing system 100 could enable an advertiser to launch a successful advertisement campaign with decreased interference from client filters. While it is difficult to stop all forms of filtering, the technique for rewriting URLs described herein allows ISPs to decrease the ability of their customers to block URLs—a valuable service that the ISP can offer to advertisers.

In the embodiment shown in FIG. 5, the client 110, through the ISP 505, makes a request for data, such as a Web page, from the server 115. The server 115 returns the Web page in response to the client request. The re-writing system 100 in the ISP 505 examines the returned Web page for links to other Web pages, some of which are typically advertisements. Typically the domains named in the URLs are domains of known advertisers such that the domains will be recognized by the filter at the client 110 and will be blocked. The re-writing system 100 is also able to recognize domains of advertising publishers because, for example, the ISP may store advertisement publishers' data in the re-writing system 100 database in order to provide guaranteed delivery of advertisements.

When the re-writing system 100 recognizes a URL from a known advertisement publisher such as from advertisement publisher 510, the re-writing system 100 generates an arbitrary name for the advertiser's domain. The re-writing system 100 then replaces the original URL in the received Web page with the URL having the arbitrary domain and forwards the Web page to the client 110. By using an arbitrary name rather than the identified advertisement publisher domain, URL filters in operation at the client 110 are circumvented. The re-writing system 100, however, must also intercept DNS traffic generated when the client 110 requests data in response to the links on the received Web page. The re-writing system 100 translates the false domain back to the real domain so the name lookup succeeds in the DNS system.

In an alternative embodiment of the re-writing system of FIG. 5, the arbitrary name created to replace the URL in the Web page is made close to a URL from a desirable site. For example, in a Web page containing URLs U1, U2, and U3 where URLs U1 and U2 point to information related to the Web page and U3 is an advertisement, the arbitrary name of the replacement URL would be selected to resemble the URLs U1 or U2. For example, where the domain name in U1 is U1XXYZ, the domain name selected for U5 could be U1XXZY in order to make it difficult to distinguish the arbitrary domain name from the desirable, non-advertisement domain name.

In a further alternative embodiment of the re-writing system, the arbitrary name is created such that it passes a selected checksum test. That is, the re-writing system can construct the arbitrary name such that the domain name or the URL path or a specified part of the URL path satisfies a predetermined checksum test. For example, the arbitrary domain name or arbitrary URL path could be constructed such that the last four characters are computed by the re-writing system to be a hash of the preceding characters. The re-writing system would then be able to check client requests using the predetermined checksum test before doing a database lookup. In this way, the re-writing system has an efficient way of determining whether a URL is re-written because the re-writing system knows that a URL passing the predetermined checksum test has an arbitrary name.

The technique described above of replacing a domain name with an arbitrary name can also be used with slight modification to prevent particular IP addresses from being blocked.

When the re-writing system 100 receives a Web page, for example, with an IP address that should not be blocked, the re-writing system replaces the IP address with a private IP address such as 10.x.x.x or alternatively, with an address from a pool of real IP addresses the ISP has set aside for the purpose. When Web requests are made to these replacement IP addresses, the re-writing system recognizes a re-written IP address and changes the re-written IP address back to the original IP address before sending the data on its way.

In a further alternative embodiment of the present invention, the re-writing system 100 translates a selected number of "normal" URLs pointing to data that a user intends to see in order to prevent a URL filter from "outsmarting" the re-writing system 100. This modification prevents a filter from implementing a convention of blocking arbitrary URLs because the filter will then also block some of the data that the user wants to see. Preferably replacing "normal" URLs is limited to static content such as GIF and JPEG images, so that bookmarked pages do not point to arbitrary domain names. Preferably the "Host" fields in the GET requests of those "normal" URLs are also changed back to the original content before forwarding the GET requests because receiving false hostnames in GET requests breaks some Web sites.

Figure 6:
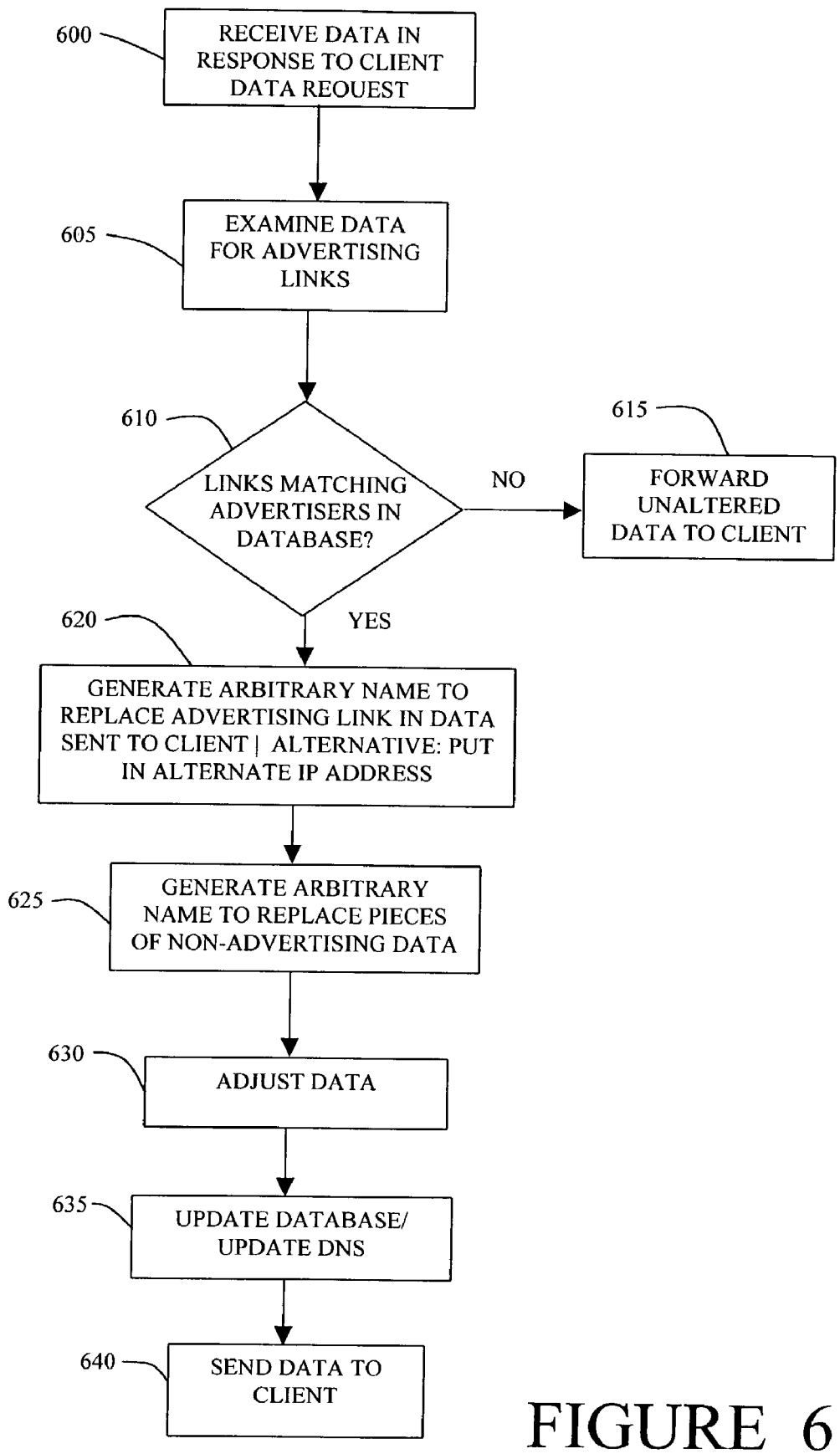
FIG. 6 is a flow chart of the operation sending data to the client in the re-writing system of FIG. 5.

FIG. 6 is a flow chart of the operation of the re-writing system of FIG. 5 for replacing advertiser's URLs or alternatively for replacing IP addresses in data returned in response to a client request.

First, a Web page is received in response to a data request from the client 110, block 600. The re-writing system 100 examines the data for links to advertisers, block 605. The re-writing system 100 performs a database lookup for each found link, block 610. If no matches are found, the Web page is forwarded unaltered to the client, block 615.

For each matching link, the re-writing system 100 generates an arbitrary name to replace the advertiser's domain in the URL, block 620. Alternatively, where the links are IP addresses rather than URLs, the re-writing system 100 replaces the IP addresses with false IP addresses or IP addresses from the ISP's pool of ISP addresses, block 620.

Then, the rewriting system 100 selects a number of non-advertising links from the Web page, preferably static data as mentioned above, and generates arbitrary names and replaces the domains of the non-advertising links with the arbitrary names, block 625.

The re-writing system 100 adjusts the altered Web page as discussed above with regard to FIG. 2, block 630. The re-writing system 100 updates the database with the arbitrary replacement names and corresponding actual advertiser domains, block 635. The database modification is necessary so that the re-writing system recognizes requests having arbitrary domain names so that it can replace the arbitrary names with the real names. Alternatively, the re-writing system 100 updates the database with the replacement IP addresses and corresponding actual IP addresses, block 635. The re-writing system then forwards the modified Web page with the replacement links to the client, block 640.

Figure 7:
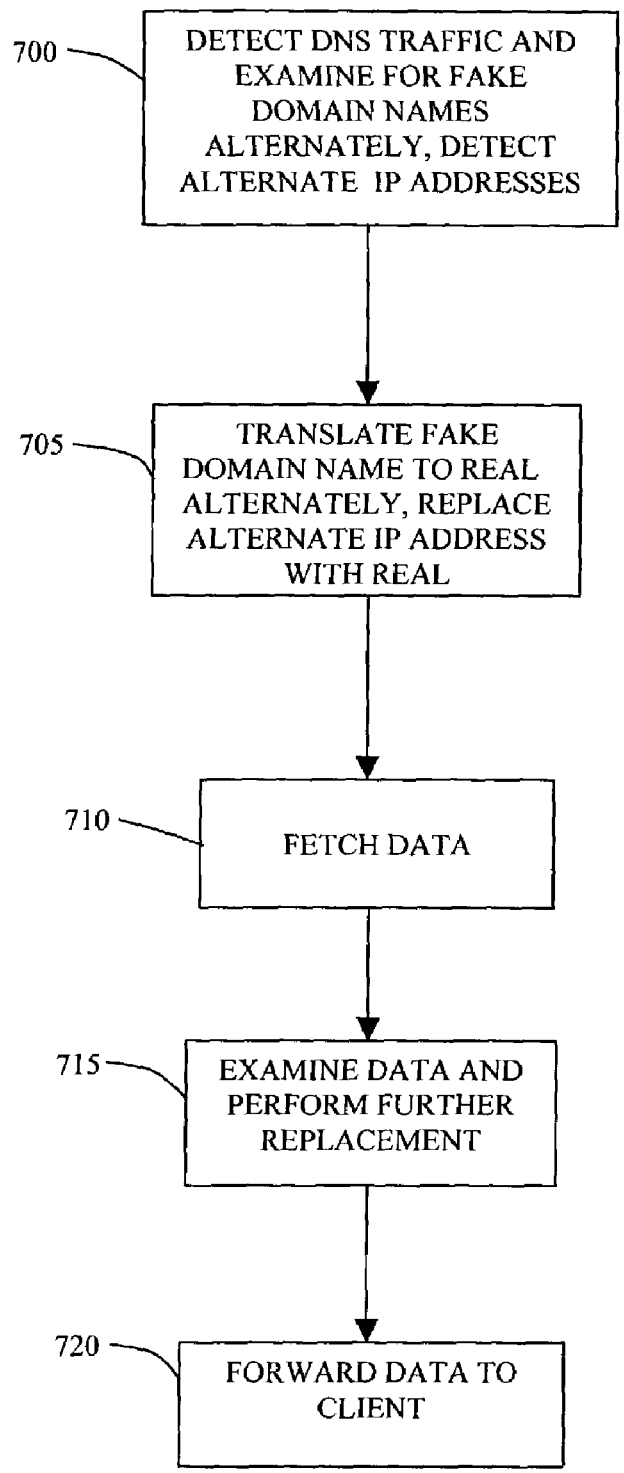
FIG. 7 is a flow chart of the operation of handling data received from the client in the re-writing system of FIG. 5.

FIG. 7 is a flow chart of the operation of the re-writing system of FIG. 5 when receiving return traffic from the client in response to the modified Web page. The rewriting system detects DNS traffic from the client and examines it for arbitrary, or false, domain names, block 700. Alternatively, the re-writing system 100 detects replacement IP addresses in the client data traffic, block 700.

The re-writing system 100 translates the false domain names to real domain names, block 705. Alternatively, the re-writing system 100 translates replacement IP addresses back to real IP addresses, block 705. The re-writing system 100 then forwards the client request to the various servers called out in the Web page, block 710. The re-writing system 100 examines the data returned in response to the client request for links (or alternatively, IP addresses) requiring replacement and the replacement is performed, block 715. The data is forwarded to the client, block 720.

Figure 8:
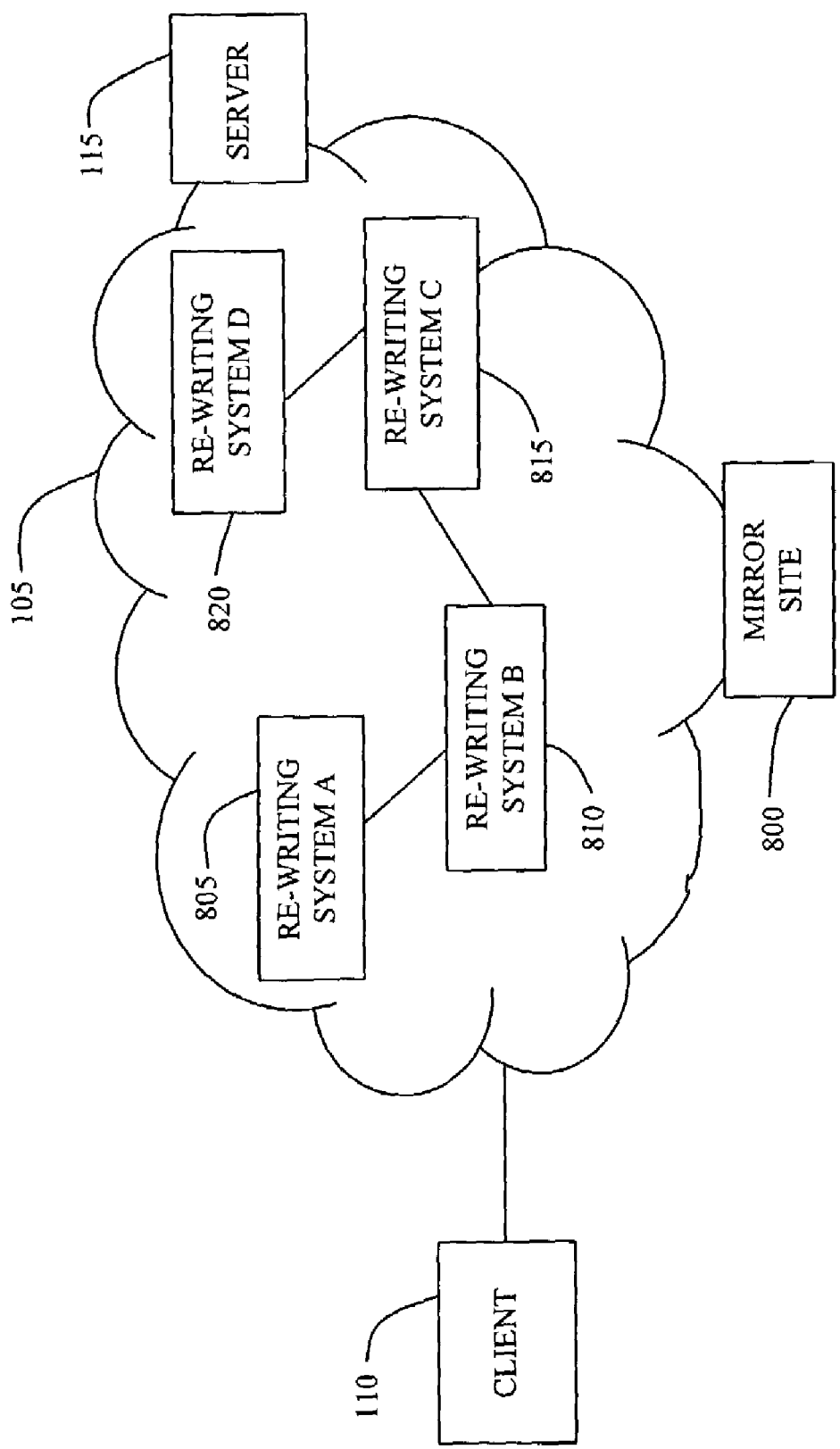
FIG. 8 is a block diagram of a computer network having a series of re-writing systems according to the principles of the present invention.

FIG. 8 is a block diagram of a network including a plurality of re-writing systems in a fourth embodiment where the re-writing systems are configured to operate as a network similar to the DNS system in order to provide a link to an optimal alternative site. In FIG. 8, the client 110 is connected to the server 115 by a network 105. A mirror site 800 holding a copy of the server data is also connected to the network 105. The network 105 includes a plurality of re-writing systems, re-writing system A 805, re-writing system B 810, re-writing system C 815, and re-writing system D 820. Each re-writing system 805, 810, 815, 820 has its own database as shown in the re-writing system 100 of FIG. 1.

In operation, the client 110 makes a request for data, such as a Web page, from the server 1115. The server 1115 returns a data in response to the client request. One of the re-writing systems, for example re-writing system D 820 intercepts the returned data and examines the returned data for links, that is, URLs, to other data. The re-writing system D 820 determines, based on stored data in the database 130, whether there are alternate URLs for those present in the returned data. If re-writing system D 820 does not find match in its database for a found link, the re-writing system D 820 forwards the link to another re-writing system, for example re-writing system C 815 until a match is found or times out as in the DNS system. If an alternate URL exists for a particular URL found in the returned data, the re-writing system 815 replaces the URL in the returned data with the alternate URL from the database 130. After link replacement is finished, the re-writing system 100 adjusts the returned data in order to avoid violating data expectations and checks at the client browser. The re-writing system 100 then forwards the returned data to the client 110.

In alternative embodiments of the invention, the re-writing system may be implemented in one of a number of locations in a network. Embodiments of the invention include implementing the re-writing system in a network router, as part of a Network Address Translation system, or in a proxy server.

In further alternative embodiments of the invention, the database stores the records of IP addresses and associated arbitrary IP addresses for a limited period of time, for example, a day. In this alternative embodiment, the checksum test of received client requests having re-written URLs can be used to locate the real web sites even after the records to the IP address and associated arbitrary IP address have been discarded from the database. If the re-written URL is constructed to include an identifying number corresponding to the advertiser or to the web site of the real URL, then the re-writing system can translate the re-written URL to a default URL directed to that advertiser.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a re-writing system that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a re-writing that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

The invention claimed is:

1. A method for re-writing a received link with an alternative link in a computer network, comprising the steps of:
   receiving data requested by a client;
   examining said received data for links to additional data;
   comparing said links to entries in a database, wherein said database stores advertiser URLs with corresponding arbitrary URLs, said comparing further comprising comparing said links to said advertiser URLs;
   for each link matching an advertiser URL stored in said database, replacing said matched link in said received data with a corresponding arbitrary URL from said database; and
   forwarding said received data with the arbitrary URL to said client,
   wherein:
   (i) the computer network is the worldwide web;
   (ii) the received data is a first web page being returned from a server to the client in response to a first request from the client;
   (iii) the client may include an ad blocker operative to block the advertiser URL but not operative to block the arbitrary URL; and
   (iv) the received data forwarded to the client comprises an adjusted first web page created by adjusting the first web page with the arbitrary URL to avoid violating expectations and checks of the first web page at the client computer system;
   and further comprising:
   (v) intercepting a second request from the client for a second web page in response to activating the arbitrary URL in the adjusted first web page, the second request containing the arbitrary URL;
   (vi) replacing the arbitrary URL in the second request with the advertiser URL from the matching entry of the database; and
   (vii) forwarding the second request with the advertiser URL for servicing within the worldwide web.

2. The method of claim 1 further comprising the steps of:
   from those links in said received data having no match in said database, selecting at least one link; and
   replacing said at least one link with an alternative URL before forwarding said received data to said client.

3. The method of claim 2 wherein said at least one link is a URL to an image file.

4. The method of claim 1 wherein said database stores server URLs with corresponding priority data URLs and
   said comparing step further comprises the step of comparing said links to said server URLs; and
   said replacing step further comprises the step of replacing each said matched link with a corresponding priority data URL.

5. The method of claim 1 wherein said received data is a Web page and forwarding step further comprises the steps of
   checking said Web page having alternative links versus said Web page as originally received for length; and
   if the lengths are different, adjusting the length of said Web page having alternative links to match the length of said originally received Web page.

6. The method of claim 1 wherein said forwarding step further comprises the step of inserting data into data packets of said received data having alternative links before forwarding to said client to avoid an error condition at said client.

7. The method of claim 1 further comprising the step of providing entries to said database such that each said alternative link satisfies a specified checksum test indicating whether a link to additional data is an alternative link; and
   wherein said examining step further comprises performing said specified checksum test on said links; and
   wherein said comparing step further comprises comparing to entries in said database only links satisfying said specified checksum test.

8. The method of claim 1 further comprising the step of providing entries to said database wherein at least one alternative link includes a default code such that the alternative link can be used as a pointer to a real web site when a database entry having said at least one alternative is not found.

9. A method for re-writing a received URL with an alternative URL in a computer network having a plurality of re-writing systems, comprising the steps of:
   a) receiving data requested by a client at a first re-writing system;
   b) examining said received data for links to additional data;
   c) comparing said links to entries in a first database in said first re-writing system, wherein said first database stores advertiser URLs with corresponding arbitrary URLs, said comparing further comprising comparing said links to said advertiser URLs;
   d) for each link matching an advertiser URL stored in said first database, replacing said matched link in said received data with the corresponding arbitrary URL from said first database;
   e) if a match is not found in said first database, comparing said links to entries in a second database in a second re-writing system, wherein said second database also stores advertiser URLs with corresponding arbitrary URLs, said comparing further comprising comparing said links to said advertiser URLs;
   f) if no match is found in said second database, repeating step e) with the remaining re-writing systems until an end-of-procedure point is reached,
   wherein:
   (i) the computer network is the worldwide web;
   (ii) the received data is a first web page being returned from a server to the client in response to a first request from the client; and (iii) the client may include an ad blocker operative to block the advertiser URL but not operative to block the arbitrary URL;

and further comprising:

(iv) adjusting the first web page with the arbitrary URL to avoid violating expectations and checks of the first web page at the client computer system;

(v) forwarding the adjusted first web page to the client;

(vi) intercepting a second request from the client for a second web page in response to activating the arbitrary URL in the adjusted first web page, the second request containing the arbitrary URL;

(vii) replacing the arbitrary URL in the second request with the advertiser URL from a matching entry of the database; and (viii) forwarding the second request with the advertiser URL for servicing within the worldwide web.

10. The method of claim 9 wherein said end-of-procedure point is a matching entry in one of said plurality of databases.

11. The method of claim 9 wherein said end-of-procedure point is a time-out period.

12. A URL re-writing system connected to a network, comprising:

a processor;

a memory connected to said processor; and a database connected to said processor, wherein said database stores advertiser URLs with corresponding arbitrary URLs;

said processor being operative:

(1) to examine data received in response to a client request;

(2) to compare links in said received data to advertiser URLs stored in said database; and (3) to re-write matched links in said received data with corresponding arbitrary URLs from said database, and to forward said received data with arbitrary URLs to said client, wherein (i) the computer network is the worldwide web;

(ii) the received data is a first web page being returned from a server to the client in response to a first request from the client;

(iii) the client may include an ad blocker operative to block the advertiser URL but not operative to block the arbitrary URL; and (iv) the received data forwarded to the client comprises an adjusted first web page created by adjusting the first web page with the arbitrary URL to avoid violating expectations and checks of the first web page at the client computer system;

and wherein the processor is further operative to:

(v) intercept a second request from the client for a second web page in response to activating the arbitrary URL in the adjusted first web page, the second request containing the arbitrary URL;

(vi) replace the arbitrary URL in the second request with the advertiser URL from the matching entry of the database; and (vii) forward the second request with the advertiser URL for servicing within the worldwide web.

13. A URL re-writing system, comprising:

means for receiving data requested by a client;

means for examining said received data for links to additional data;

means for comparing said links to entries in a database, wherein said database stores advertiser URLs with corresponding arbitrary URLs;

means for replacing each matched link in said received data with an arbitrary URL from said database if a match is found in said database; and means for forwarding said received data with arbitrary URL to said client, wherein:

(i) the computer network is the worldwide web;

(ii) the received data is a first web page being returned from a server to the client in response to a first request from the client;

(iii) the client may include an ad blocker operative to block the advertiser URL but not operative to block the arbitrary URL; and (iv) the received data forwarded to the client comprises an adjusted first web page created by adjusting the first web page with the arbitrary URL to avoid violating expectations and checks of the first web page at the client computer system;

and further comprising:

(v) means for intercepting a second request from the client for a second web page in response to activating the arbitrary URL in the adjusted first web page, the second request containing the arbitrary URL;

(vi) means for replacing the arbitrary URL in the second request with the advertiser URL from the matching entry of the database; and (vii) means for forwarding the second request with the advertiser URL for servicing within the worldwide web.

14. The URL re-writing system of claim 13 implemented in a NAT system.

15. The URL re-writing system of claim 14 implemented in a proxy server in the network.

16. The URL re-writing system of claim 13 implemented in a router in the network.

17. A computer program product having a computer-readable medium including computer program logic encoded thereon that, when performed on a computer system having a coupling of a memory, a processor, and at least one communications interface, provides a method for re-writing a received URL with an alternative URL in a computer network by performing the operations of:

receiving data requested by a client;

examining said received data for links to additional data;

comparing said links to entries in a database, wherein said database stores advertiser URLs with corresponding arbitrary URLs;

for each link matching a link stored in said database, replacing said matched link in said received data with an associated arbitrary URL from said database; and forwarding said received data with the arbitrary URL to said client, wherein:

(i) the computer network is the worldwide web;

(ii) the received data is a first web page being returned from a server to the client in response to a first request from the client; and (iii) the client may include an ad blocker operative to block the advertiser URL but not operative to block the arbitrary URL;

and wherein the method provided by the computer program logic further includes the operations of:

(iv) adjusting the first web page with the arbitrary URL to avoid violating expectations and checks of the first web page at the client computer system;

(v) forwarding the adjusted first web page to the client;

(vi) intercepting a second request from the client for a second web page in response to activating the arbitrary URL in the adjusted first web page, the second request containing the arbitrary URL;

(vii) replacing the arbitrary URL in the second request with the advertiser URL from a matching entry of the database; and (viii) forwarding the second request with the advertiser URL for servicing within the worldwide web.

* * * * *

UNITED STATES PATENT AND TRADEMARK OFFICE
CERTIFICATE OF CORRECTION

PATENT NO. : 7,058,633 B1
APPLICATION NO. : 10/237339
DATED : June 6, 2006
INVENTOR(S) : Matthew R. Gnagy et al.

It is certified that error appears in the above-identified patent and that said Letters Patent is hereby corrected as shown below:

Claim 15, Column 14, Line 35, "14" should read --13--.

Signed and Sealed this

Eighth Day of August, 2006

JON W. DUDAS
*Director of the United States Patent and Trademark Office*